United States Patent
Min et al.

(10) Patent No.: US 10,942,039 B2
(45) Date of Patent: Mar. 9, 2021

(54) METHODS AND SYSTEMS FOR MANAGING COMMUNICATION SESSIONS

(71) Applicant: Comcast Cable Communications, LLC, Philadelphia, PA (US)

(72) Inventors: Rui Min, Vienna, VA (US); Hongcheng Wang, Falls Church, VA (US); Vamsi Potluru, Washington, DC (US); Vijayendra Ghadge, Silver Spring, MD (US); Raul Guerra Paredes, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 95 days.

(21) Appl. No.: 16/056,015

(22) Filed: Aug. 6, 2018

(65) Prior Publication Data
US 2020/0041300 A1 Feb. 6, 2020

(51) Int. Cl.
*G10L 21/00* (2013.01)
*G01C 21/36* (2006.01)
(Continued)

(52) U.S. Cl.
CPC .......... *G01C 21/3608* (2013.01); *G10L 15/18* (2013.01); *G10L 15/22* (2013.01)

(58) Field of Classification Search
CPC ... H04L 65/1069; H04L 69/329; H04L 67/02; H04L 67/10; H04L 51/00; H04L 65/80; H04L 67/14; H04L 67/22; H04L 12/1831; H04L 67/26; H04L 67/306; H04L 67/32; G06F 16/954; G06F 21/10; G06F 2216/15; G06F 15/435; G06F 16/44; G06F 16/9535; G06F 3/0484; G06F 3/167; G06F 40/14;
(Continued)

(56) References Cited

U.S. PATENT DOCUMENTS

| | | | | |
|---|---|---|---|---|
| 7,987,491 B2* | 7/2011 | Reisman | ............... | G06F 16/954 725/112 |
| 8,161,172 B2* | 4/2012 | Reisman | ............... | G06F 16/954 709/228 |
| 8,219,655 B2* | 7/2012 | Yano | ................... | H04L 65/1069 704/270 |
| 8,914,840 B2* | 12/2014 | Reisman | ............... | G06F 16/954 725/133 |

(Continued)

FOREIGN PATENT DOCUMENTS

CN 107180635 A 9/2017
EP 3012833 A1 4/2016

OTHER PUBLICATIONS

European Search Report and Written Opinion dated Nov. 27, 2019 by the European Patent Office for EP Application No. 19190382.2, filed on Aug. 6, 2019 and published as EP 3609157 on Feb. 12, 2020 (Applicant—Comcast Cable Communications, LLC) (22 Pages).

*Primary Examiner* — Vijay B Chawan
(74) *Attorney, Agent, or Firm* — Ballard Spahr LLP

(57) ABSTRACT

A voice enabled device can assist a computing device, such as a server, in processing/analyzing a voice input. The voice enabled device can initiate a network communication session and transmit the voice input to the computing device. The computing device can classify the voice input as a type of communication session (e.g., conversation, etc . . . ). Based on the type of communication session, the computing device can either remain in communication with the voice enabled device and continue to process voice input or terminate the communication after instructing the voice enabled device to process the voice input.

20 Claims, 6 Drawing Sheets

(51) Int. Cl.
*G10L 15/18* (2013.01)
*G10L 15/22* (2006.01)

(58) Field of Classification Search
CPC ........... H04N 21/2225; H04N 21/2387; H04N 21/25; H04N 21/2665; H04N 21/4113; H04N 21/4126; H04N 21/41407; H04N 21/4143; H04N 21/47; H04N 21/42204; H04N 21/4312; H04N 21/4316; H04N 21/4358; H04N 21/43637; H04N 21/4532; H04N 21/4622; H04N 21/4668; H04N 21/47202; H04N 21/4755; H04N 21/478; H04N 21/4782; H04N 21/482; H04N 21/6175; H04N 21/6193; H04N 21/643; H04N 21/6587; H04N 21/8173
USPC ... 725/112, 113, 110, 133, 14, 141, 153, 25, 725/40, 51, 86; 704/270, 270.1, 275; 709/201, 203, 217, 223, 227, 228, 229, 709/232, 246
See application file for complete search history.

(56) References Cited

U.S. PATENT DOCUMENTS

| | | | | |
|---|---|---|---|---|
| 9,916,128 | B2* | 3/2018 | Badger | G06F 40/14 |
| 2005/0021826 | A1* | 1/2005 | Kumar | H04L 67/14 |
| | | | | 709/232 |
| 2007/0010266 | A1* | 1/2007 | Chaudhuri | H04M 3/4931 |
| | | | | 455/466 |
| 2007/0130253 | A1* | 6/2007 | Newson | H04L 29/06 |
| | | | | 709/203 |
| 2008/0120358 | A1* | 5/2008 | Yano | H04L 65/1069 |
| | | | | 709/201 |
| 2013/0067526 | A1* | 3/2013 | Reisman | G06F 16/954 |
| | | | | 725/112 |
| 2013/0272511 | A1 | 10/2013 | Bouzid et al. | |
| 2015/0143395 | A1* | 5/2015 | Reisman | G06F 16/954 |
| | | | | 725/14 |
| 2017/0164217 | A1* | 6/2017 | Lazarescu | H04L 67/142 |
| 2018/0120358 | A1* | 5/2018 | Nakayama | G01R 15/183 |
| 2018/0191808 | A1 | 7/2018 | Bhaya et al. | |

* cited by examiner

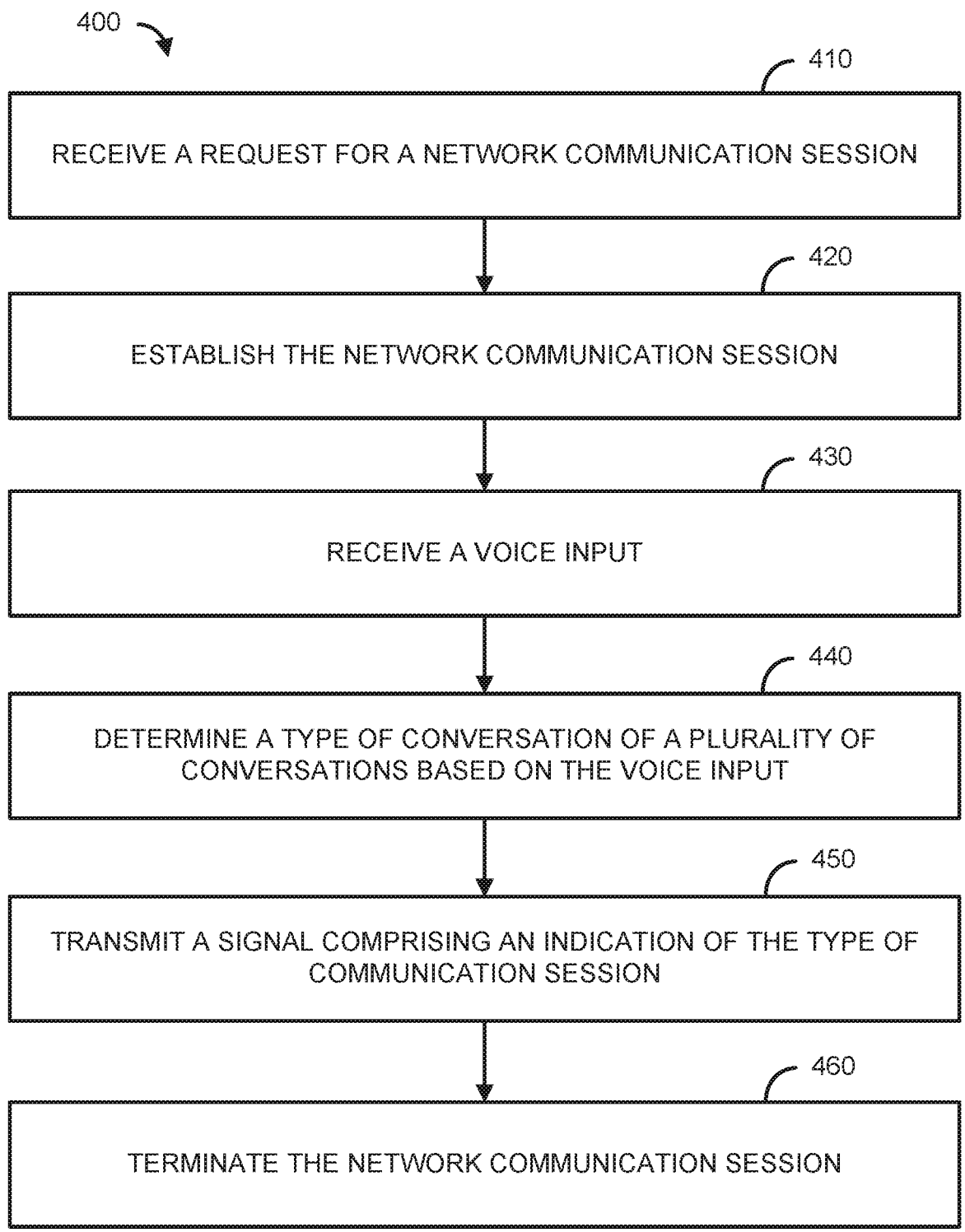

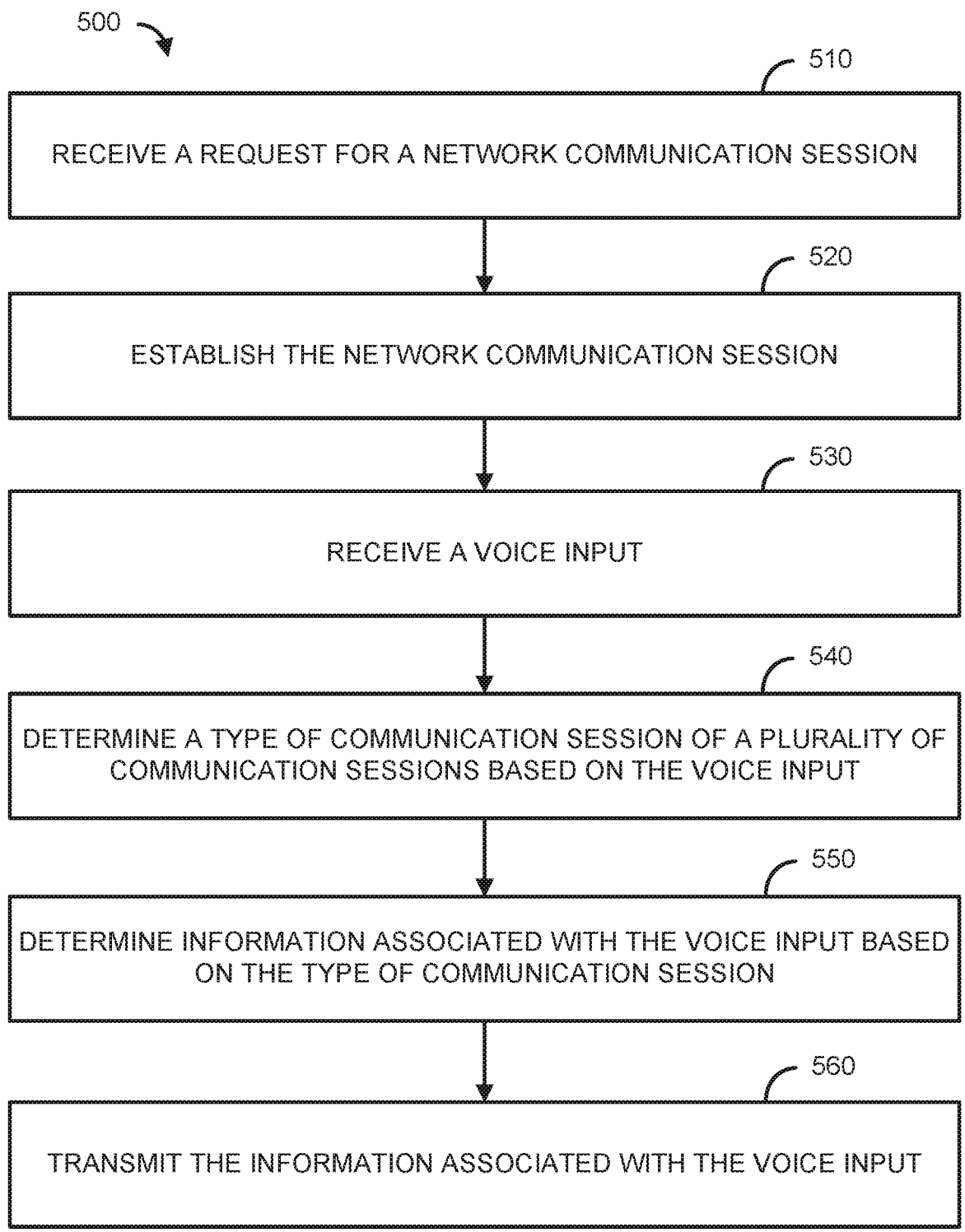

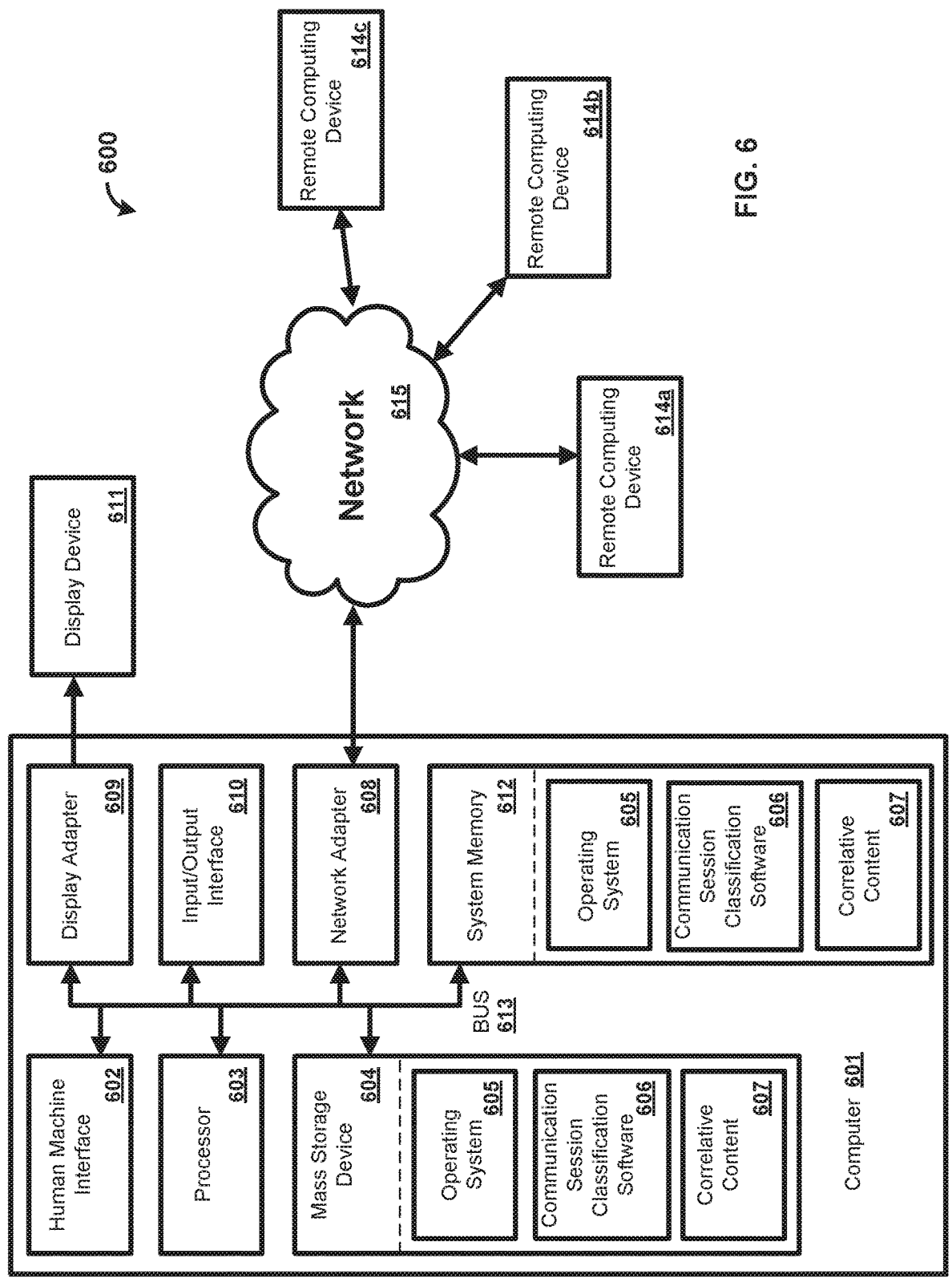

METHODS AND SYSTEMS FOR MANAGING COMMUNICATION SESSIONS

BACKGROUND

Voice enabled devices configured to respond to a user's voice command are becoming more ubiquitous. Typically, a user will initiate a network communication session with a voice enabled device by speaking a routine (e.g., associated with stored information, correlative, etc . . . ) command, such as "Hello." During the network communication session, the user can speak to the voice enabled device to request information, communicate information, execute commands, and the like. Voice/audio captured by the voice enabled device during a network communication session can be transmitted to a remote device, such as a server, for processing and analysis. To ensure that voice/audio captured by the voice enabled device is processed timely by the remote device, open lines of communication (e.g., network sockets, web sockets, etc.) between the voice enabled device and remote device are maintained during the network communication session. The open lines of communication consume a significant amount bandwidth as well as network and processing resources. Command and response systems exist where certain commands trigger a voice enabled device to open communications with a remote device and the communication is closed after a response is provided. Such systems are ineffective when a conversational flow of communications is needed between the voice enabled device and the remote device, and the result is a poor user experience. These and other shortcomings are addressed by the present disclosure.

SUMMARY

It is to be understood that both the following general description and the following detailed description are examples and explanatory only and are not restrictive. Provided are methods and systems for managing communication sessions. A voice enabled device can perform audio capture and speech recognition functions to assist a computing device, such as a server, in processing and analyzing a voice input. The voice enabled device can be configured with one or more microphones to detect a voice input, such as a voice command or audible query from a user. To process the voice input, the voice enabled device can initiate a network communication session with the computing device and transmit the voice input to the computing device.

The computing device can use natural language processing to analyze the voice input and classify the voice input as a type of communication session (e.g., conversation, etc . . . ). For example, the type of communication session can be a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), and/or a type of communication session associated with detailed voice activity (e.g., a request for information, a request for content/item analysis, a detailed/extensive request/query, etc . . . ). Based on the type of communication session, the computing device can remain in communication with the voice enabled device and continue to process the voice input, or the computing device can instruct the voice enabled device to process the voice input and terminate the communication with the voice enabled device. A network communication session between the voice enabled device and the computing device can be reestablished in the event that the voice enabled device is unable to process the voice input and/or receipt of a subsequent voice input from the user.

Additional advantages will be set forth in part in the description which follows or may be learned by practice. The advantages will be realized and attained by means of the elements and combinations particularly pointed out in the appended claims:

BRIEF DESCRIPTION OF THE DRAWINGS

The accompanying drawings, which are incorporated in and constitute a part of this specification, provide examples and together with the description, serve to explain the principles of the methods and systems:

FIG. 4 is a flowchart of an example method for managing communication sessions;

FIG. 5 is a flowchart of an example method for managing communication sessions; and FIG. 6 is a block diagram of an example computing device in which the present methods and systems can operate.

DETAILED DESCRIPTION

Figure 1:
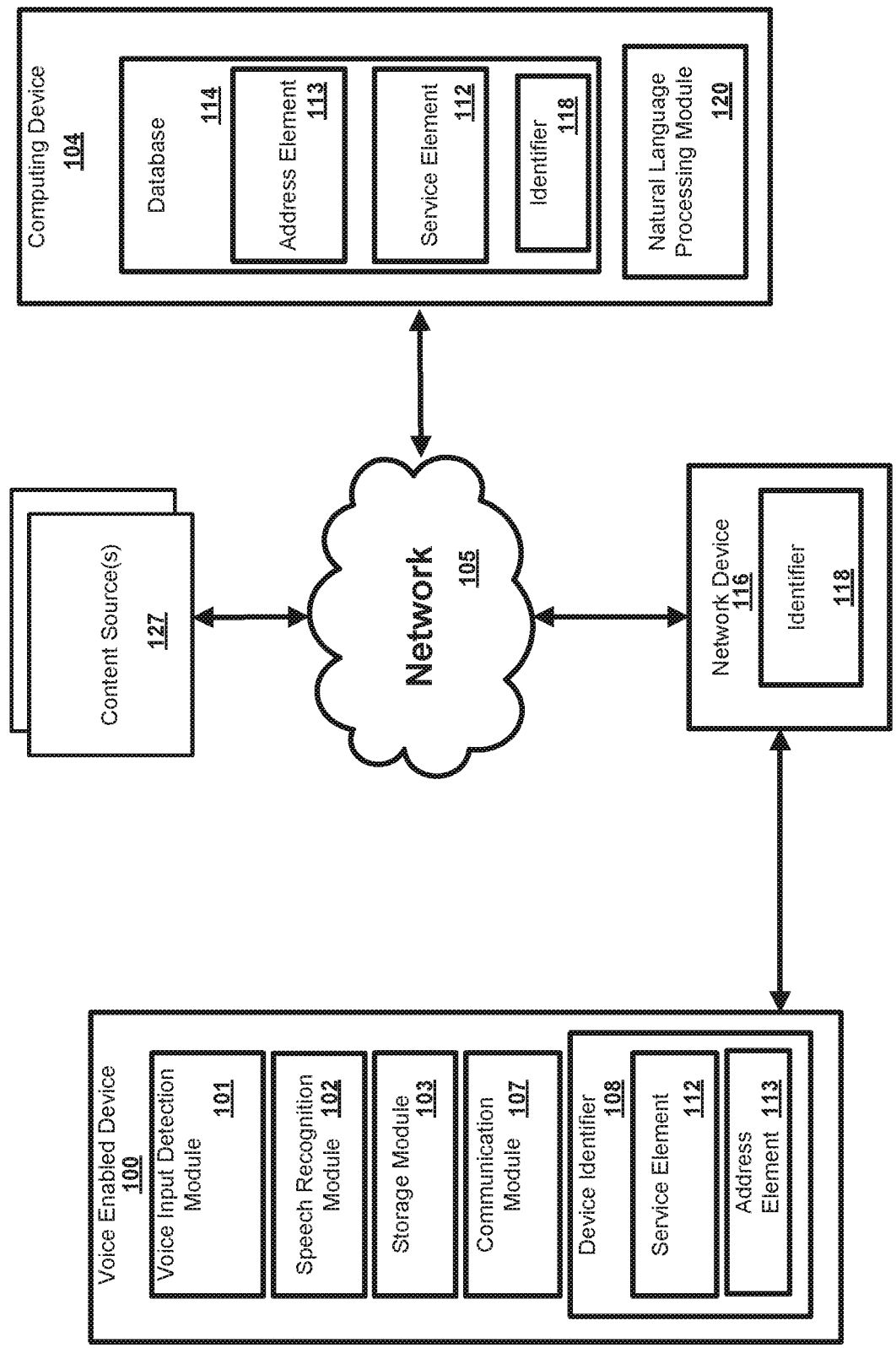
FIG. 1 is an environment in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for managing communication sessions. A voice enabled device can assist a computing device, such as a server, in processing and analyzing a voice input. The voice enabled device can use one or more microphones to detect a voice input, such as a voice command or audible request/query from a user. The voice enabled device can request/initiate a network communication session and transmit the voice input to a computing device, such as a server, for example.

The computing device can receive the voice input (e.g., data indicative of the voice input) and use natural language processing and/or speech recognition to classify the voice input as a type of communication session (e.g., conversation, etc . . . ) of a plurality of types of communication sessions. For example, the type of communication session can be a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), a type of communication session associated with detailed voice activity (e.g., a request for information, a request for content/item analysis, a detailed/extensive request/query, etc . . . ), or any other type of communication session (e.g., conversation, etc . . . ). As described further herein, the computing device can use various methods to determine a type of communication session. The computing device can determine any type of communication session. The voice enabled device can use the one or more microphones to persistently detect and capture voice input from the user.

The network communication session between the voice enabled device and the computing device may not be persistent. For example, the network communication session between the voice enabled device and the computing device can be established, terminated, and/or reestablished intermittently based on a type of communication session (e.g., conversation, etc . . . ) associated with the voice input. For example, the computing device can determine that a type of communication session is associated with commands, such as when the user provides a voice input (e.g., says) "guide." The computing device can determine that the command "guide," is associated with other guide-related commands (e.g., "scroll up," "scroll down," etc . . . ), provide instructions/information for the voice enabled device to provide an appropriate response to the user, and terminate the network communication session.

Terminating the network communication session improves the performance of a network by allowing bandwidth allocated for and/or associated with network communication sessions to be reallocated for additional network communication sessions. As such, communication and/or computing overhead within a network can be saved, and load balancing within the network can be improved through an increase of available bandwidth. If the user provides additional voice input, such as voice input associated with a different type of communication session (e.g., conversation, etc . . . ), the network communication session can be reestablished.

FIG. 1 shows an example system configured to manage communication sessions. Those skilled in the art will appreciate that the present methods may be used in various types of networks and systems that employ both digital and analog equipment. One skilled in the art will appreciate that provided herein is a functional description and that the respective functions can be performed by software, hardware, or a combination of software and hardware. The network and system can comprise a voice enabled device 100. The voice enabled device 100 can be a device such as a smart speaker, a system control device, a smart phone, a communications terminal, a wireless device, and the like. The voice enabled device 100 can be in communication with a network such as a network 105 via a network device 116. The network 105 can be a network such as the Internet, a wide area network, a local area network, a Wi-Fi network, a cellular network, a satellite network, a combination thereof, and the like. Various forms of communications can occur via the network 105. The network 105 can comprise wired and wireless communications and communication techniques. The network 105 can comprise one or more network device(s) 116. The network device 116 can be configured as a wireless access point (WAP) to facilitate a connection to the network 105. The network device 116 can be configured to allow one or more devices (e.g., the voice enabled device 100, a computing device 104, wireless devices, etc . . . ) to connect to a wired and/or wireless network using Wi-Fi, Bluetooth or any desired method or standard.

The network device 116 can be configured as a local area network (LAN). For example, the network device 116 can comprise a dual band wireless access point. The network device 116 can be configured with a first service set identifier (SSID) (e.g., associated with a user network or private network) to function as a local network for a particular user or users. As a further example, the network device 116 can be configured with a second service set identifier (SSID) (e.g., associated with a public/community network or a hidden network) to function as a secondary network or redundant network for connected communication devices (e.g., the voice enabled device 100, the computing device 104, etc . . . ).

The network device 116 can comprise an identifier 118. As an example, the identifier 118 can be or relate to an Internet Protocol (IP) Address IPv4/IPv6 or a media access control address (MAC address) or the like. As a further example, the identifiers 118 can be a unique identifier for facilitating communications on the physical network segment. The identifier 118 can be associated with a physical location of the network device 116.

The voice enabled device 100 can be associated with a device identifier 108. As an example, the device identifier 108 can be any identifier, token, character, string, or the like, for differentiating one voice enabled device from another voice enabled device. The device identifier 108 can identify voice enabled device 100 as belonging to a particular class of voice enabled devices. As a further example, the device identifier 108 can comprise information relating to the voice enabled device 100 such as a manufacturer, a model or type of device, a service provider associated with the voice enabled device 100, a state of the voice enabled device 100, a locator, and/or a label or classifier. Other information can be represented by the device identifier 108.

The device identifier 108 can comprise an address element 113 and a service element 112. The address element 113 can comprise or provide an internet protocol address, a network address, a media access control (MAC) address, an Internet address, or the like. For example, the address element 113 can be relied upon to establish a network communication session between the voice enabled device 100, a computing device 104, other devices and/or networks. The address element 113 can be used as an identifier or locator of the voice enabled device 100.

The service element 112 can comprise an identification of a service provider (e.g., Internet service provider, device manufacturer, retailer, etc . . . ) associated with the voice enabled device 100 and/or with a class of voice enabled device 100. The class of the voice enabled device 100 can be related to a type of device, a capability of device, a type of service being provided, and/or a level of service (e.g., business class, service tier, service package, etc.). For example, the service element 112 can comprise information relating to or provided by a communication service provider (e.g., Internet service provider) that is providing or enabling data flow such as communication services to the voice enabled device 100. The service element 112 can comprise information relating to a preferred service provider for one or more particular services relating to the voice enabled device 100. The address element 113 can be used to identify or retrieve data from the service element 112, or vice versa. One or more of the address element 110 and the service element 112 can be stored remotely from the voice enabled device 100 and retrieved by one or more devices, such as the voice enabled device 100 and/or the computing device 104, for example. Other information can be represented by the service element 112.

The voice enabled device 100 can comprise a voice input detection module 101 for detecting an audible input, such as a voice input. For example, the voice input detection module 101 can detect a user speaking near the voice enabled device 100 and the like. The voice input detection module 101 can comprise one or more microphones, speakers, combinations thereof, and the like. The one or more a microphones, speakers, combinations thereof, and the like can receive a voice input and provide an audible response or an audible portion of a response to the user based on the voice input. To provide an audible response or an audible portion of a response to the user based on the voice input, the voice enabled device 100 can utilize a storage module 103. The storage module 103 can store any type of information such as correlative content that is associate with types of communication sessions (e.g., conversations, etc . . . ) such as navigation based information, command and confirmation based information (e.g., information used to control operation of one or more controllable devices, etc . . . ), combinations thereof, and the like, for example. The voice enabled device 100 (e.g., the storage module 103) can be configured with the correlative content. The voice enabled device 100 (e.g., the storage module 103) can receive the correlative content from another device, such as the computing device 104. The correlative content can be used to provide an audible response or an audible portion of a response to the user. For example, the voice enabled device 100 can retrieve and/or access the correlative content, convert/map the correlative content to acoustic information (e.g., map correlative/stored text files to acoustic files, etc . . . ), and provide the acoustic information to the user. The voice enabled device 100 can provide the acoustic information (e.g., converted correlative content, etc . . . ) to the user via one or more speakers (e.g., speakers configured with the voice input detection module 101, etc . . . ).

Further, to provide an audible response or an audible portion of a response to the user based on the voice input, the voice enabled device 100 can provide/transmit data indicative of the voice input to the computing device 104 to be processed. For example, the voice enabled device 100 can use one or more analog-to-digital conversion methods/techniques to generate a signal that can be transmitted as data indicative of the voice input to the computing device 104. The data indicative of the voice input can be a digitized version of the voice input (e.g., audible input, analog input, etc . . . ).

To provide/transmit the data indicative of the voice input to the computing device 104, the voice enabled device 100 can use a communication module 107 to request/establish a network communication session with the computing device 104. The communication module 107 can comprise a transceiver configured for communicating information using any suitable wireless protocol, for example Wi-Fi (IEEE 802.11), BLUETOOTH®, cellular, satellite, infrared, or any other suitable wireless standard. The communication module 107 can request/establish a network communication session with the computing device 104 via the network device 116 in communication with the network 105.

The computing device 104 can be a device such as a server, a cloud-based device, a remote storage device, a remote analysis device, and the like. As such, the computing device 104 can comprise a database 114 for storing information such as information associated with types of communication sessions (e.g., conversations, etc . . . ). The voice enabled device 100 or any other device in communication with the computing device 104 can request and/or retrieve information from the database 114. Further, the computing device 104 can interact with remote resources. For example, the computing device 104 can be in communication, via the network 105, with one or more content sources 127 to retrieve and/or transfer information/content based on the data indicative of the voice input. As such, the computing device 104 can be configured as (or disposed at) a central location (e.g., a headend, or processing facility), which can receive information/content from multiple sources (e.g., the content source(s) 127. The content source(s) 127 can be configured to provide content (e.g., video, audio, games, applications, data) to a user. The content source(s) 127 can be configured to provide streaming media, such as on-demand content (e.g., video on-demand), content recordings, and/or the like. The content source(s) 127 can be managed by third party content providers, service providers, online content providers, over-the-top content providers, and/or the like. The content can be provided via a subscription, by individual item purchase or rental, and/or the like.

The content source(s) 127 can be configured to provide the content via a packet switched network path, such as via an internet protocol (IP) based connection. The content can be accessed by users via applications, such as mobile applications, television applications, set-top box applications, gaming device applications, an application configured with the voice enabled device 100, and/or the like. An example application can be a custom application (e.g., by content provider, for a specific device), a general content browser (e.g., web browser), an electronic program guide, and/or the like. The computing device 104 can combine the content from the multiple sources and can distribute the information/content to the voice enabled device 100.

The computing device 104 can process data indicative of a voice input received from the voice enabled device 100. To process the data indicative of the voice input, the computing device 104 can comprise a natural language processing module 120. The natural language processing module 120 can perform natural language processing and/or speech-to-text translation, to translate spoken words (e.g., a voice input) into text, other characters, or commands. The natural language processing module 120 can apply one or more voice analysis algorithms to the data indicative of the voice input to extract a word or words (e.g., phrase). The natural language processing module 120 can convert the word or words to text and compare the text to correlative content stored in the database 114 to determine a type of communication session associated with the voice input. The natural language processing module 120 can determine a type of communication session of a plurality of types of communication sessions (e.g., conversations, etc . . . ). For example, a type of communication session associated with the voice input can be a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), a type of communication session associated with detailed voice activity (e.g., a request for information, a request for content/item analysis, etc . . . ), or any other type of communication session (e.g., conversation, etc . . . ). For example, based on speech-to-text translation and/or natural language processing via the natural language module 120, the computing device 104, can determine that a user provided a voice input as a query, "what is the address for the hospital?" The natural language module 120 can determine the voice input to be a type of communication session associated with navigation because the query contains text such as "what is" and "the address" that matches at least a portion of stored correlative content (e.g., stored in the database 114) such as addresses, locations, and the like that is associated navigation. As another example, based on speech-to-text translation via the natural language module 120, the voice enabled device 100, can determine that a user provided a voice input as the statement "turn on the television." The natural language module 120 can classify the voice input as a type of communication session associated with command because the query contains text such as "turn on" and "the television" that matches at least a portion of stored correlative content (e.g., stored in the database 114) such as operation commands associated with one or more controllable devices.

The computing device 104 can process the data indicative of the voice input received from the voice enabled device 100 and classify/determine a type of communication session (e.g., conversation, etc . . . ) by any method. For example, the natural language processing module 120 can perform natural language processing and determine that the voice input (e.g., the data indicative of the voice input) comprises a quantity of phrases that are either less than a threshold or satisfy the threshold. A threshold can be set that dictates that any voice input comprising two or less phrases of a certain character length can be classified as a first type of communication session (e.g., a type of communication session associated with navigation, a type of communication session associated with confirmation, a type of communication session associated with control, etc . . . ). Thus, a voice input comprising three or more phrases of a certain character length can satisfy (e.g., meet and/or exceed) the threshold and be classified as a second type of communication session (e.g., a type of communication session associated with natural phrases, a type of communication session associated with detailed/extensive requests and/or queries, etc . . . ). For example, the voice input can comprise single phrases such as "what is the direction to the movies?," "what time is it?," that are less than a threshold of two phrases. The voice input can comprise multiple phrases such as "what year did Matt Damon first begin acting? Was it before 1983?," that satisfies the threshold of two phrases. The computing device can determine that the voice input is associated with a first type of communication session (e.g., conversation, etc . . . ) when the quantity of phrases is less than the threshold. The computing device can determine that the voice input is associated with a second type of communication session when the quantity of phrases satisfies or exceeds the threshold. The computing device 104, based on the voice input, can determine any number of types of communication session (e.g., a plurality of types of communication sessions).

Based on the type of communication session (e.g., conversation, etc . . . ), the computing device 104 can determine whether the voice input can/should be further processed by the computing device 104 or the voice enabled device 100. The voice enabled device 100 can be configured to not to further process the voice input (or any voice input(s)). For example, based on the type of communication session, the voice enabled device 100 can/will not process the voice input (or any voice input(s)). The voice enabled device 100 can be configured to not to initially process the voice input (or any voice input(s)) before providing the voice input (or any voice input(s)) to the computing device 104. For example, the voice enabled device 100 can/will not attempt to process the voice input (or any voice input(s)). The voice enabled device 100 can provide (e.g., provided via a network communication session, etc . . . ) the voice input (or any voice input(s)) to the computing device 104 to be processed.

The computing device 104 can process the voice input (or any voice input(s)) received from the voice enabled device 100. The computing device 104 can determine that the voice input (or any voice input(s)) can/should be further processed by the computing device 104 or the voice enabled device 100. For example, the computing device 104 can classify the voice input as a type of communication session (e.g., conversation, etc . . . ) associated with detailed voice activity (e.g., a request for information, a request for content/item analysis, a detailed/extensive request/query, etc . . . ). The computing device 104 can determine that types of communication sessions associated with detailed voice activity can/should be further processed by the computing device 104. The computing device 104 can determine that types of communication sessions associated with detailed voice activity can/should be further processed by the computing device 104 because at least a portion of the detailed voice activity can be associated with and/or requires information that is associated with one or more content sources (e.g., content source(s) 127, a webpage, an online data repository, a search engine, a server, etc . . . ).

The computing device 104 can classify the voice input as a type of communication session (e.g., conversation, etc . . . ) associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), combinations thereof. The computing device 104 can determine that types of communication sessions associated with navigation, commands, confirmation, combinations thereof, and/or the like can/should be processed by the voice enabled device 100. The computing device 104 can determine that types of communication sessions associated with navigation, commands, confirmation, combinations thereof, and/or the like can/should be processed by the voice enabled device 100 because the types of communication sessions can be associated with correlative content that can be provided to the voice enabled device 100 by the computing device 104 and/or correlative content that is already stored with (e.g., stored in the storage module 103, etc . . . ) and/or associated with the voice enabled device 100. The computing device 104 can determine that types of communication sessions associated with navigation, commands, confirmation, combinations thereof, and/or the like can/should be processed by the voice enabled device 100 because the voice enabled device 100 possesses sufficient resources (e.g., hardware, software, data, etc . . . ) to process the type of voice input/communication session.

The computing device 104 can transmit a signal/instruction to the voice enabled device 100 to further process the voice input/communication session. The signal/instruction transmitted to the voice enabled device 100 to further process the voice input can be transmitted/sent via the network communication session. The signal/instructions can cause the voice enabled device 100 to process the voice input and the network communication session can be terminated. The network communication session can be terminated after instructing the voice enabled device 100 to process the voice input. Terminating the network communication session in this manner conserves resources (e.g., network resources, processing resources, data resources, etc . . . ). Terminating the network communication session enables resources (e.g., bandwidth, communication channels, intermediary communication devices, the computing device 104, the voice enabled device 100, etc . . . ) associated with the network communication session to be reallocated (e.g., data and/or resources associated with the network communication session can be real located by a load balancer or similar device, etc . . . ) and/or reserved.

The voice enabled device 100 can process the voice input. The voice enabled device 100 can process the voice input by associating/mapping text derived from the voice input to at least a portion of stored correlative content and providing an audible response or an audible portion of a response to a user associated with the voice input. For example, text derived from the voice input to can be associated with and/or matched to the correlative content (e.g., a specific set of stored voice input types, domains, etc . . . ). If the text derived from the voice input cannot be directly associated with and/or matched to the correlative content, then the text can be associated with and/or matched to the correlative content based on a threshold. For example, the text can be associated with and/or matched to the correlative content if a least a portion of the text matches the correlative content. The text can be associated with and/or matched to a plurality of correlative content. Each association/match between the text and the respective correlative content of the plurality of correlative content can be ranked. The rank can be based on how well the text matches the correlative content (e.g., a quantity of similar phrases/characters, etc . . . ). The type of communication session can be determined based on matches between the text and the correlative content with a higher/ increased rank. As another example, text such as "what is" and "the address" derived from a voice input query "what is the address of the movie theatre," can be determined to match stored correlative content (e.g., common query terms associated with navigation, etc . . . ). The voice enabled device 100 can retrieve additional stored correlative content such as addresses, locations, and the like based on the match between the text derived from the voice input query and the correlative content. The voice enabled device 100 can provide a response based on the additional stored correlative content. As another example, text such as "turn on the television," derived from a voice input query "turn on the television," can be determined to match at least a portion of stored correlative content associated with one or more operational commands. The one or more operational commands can be used to control one or more functions/services associated with the voice enabled device 100. The voice enabled device 100 can execute the one or more operational commands. The one or more operational commands can be used to control one or more controllable devices (e.g., not shown) in communication with the network 105 or otherwise in communication with the voice enabled device 100 (e.g., via BLUETOOTH®, infrared, etc . . . ). The voice enabled device 100 can use the communication module 107 to transmit one or more operational commands to one or more controllable devices.

The voice enabled device 100 can determine at any time that it is unable to process the voice input. For example, the voice enabled device 100 can determine that at least a portion of the derived text does not match at least a portion of correlative content. Accordingly, the voice enabled device 100 can request/initiate another network communication session with the computing device 104. The voice enabled device 100 can transmit at least the portion of the text that does not match at least the portion of correlative content to the computing device 104 via the network communication session. The computing device 104 can determine additional information associated with the portion of the text that does not match at least the portion of correlative content. The computing device 104 can request/retrieve the additional information (e.g., a search query response, an answer to a question, etc . . . ) from one or more content sources, such as the content source(s) 127.

Additionally, when determining a type of communication session (e.g., conversation, etc . . . ) associated with a voice input based on data indicative of the voice input received from the voice enabled device 100, the computing device 104 can request additional information (e.g., a search query response, an answer to a question, etc . . . ) from one or more content sources. The computing device 104 can request/ retrieve the additional information from the one or more content sources based on the type of communication session. For example, if the computing device 104 determines that the voice input is associated with a type of communication session associated with detailed voice activity (e.g., a request for information, a request for content/item analysis, a detailed/extensive request/query, etc . . . ), the computing device 104 can request additional data from the content source(s) 127, and after the additional information is received, transmit the additional information (e.g., a search query response, an answer to a question, etc . . . ) to the voice enabled device 100. The voice enabled device 100, based on the additional information, can generate/provide an audible response or an audible portion of a response to a user based on the voice input. For example, the voice enabled device 100 can convert/map the additional information to acoustic information (e.g., convert/map text/data files associated with the additional information to one or more acoustic files, etc . . . ), and provide the acoustic information to the user. The voice enabled device 100 can provide the acoustic information (e.g., converted correlative content, etc . . . ) to the user via one or more speakers (e.g., speakers configured with the voice input detection module 101, etc . . . ).

Figure 2:
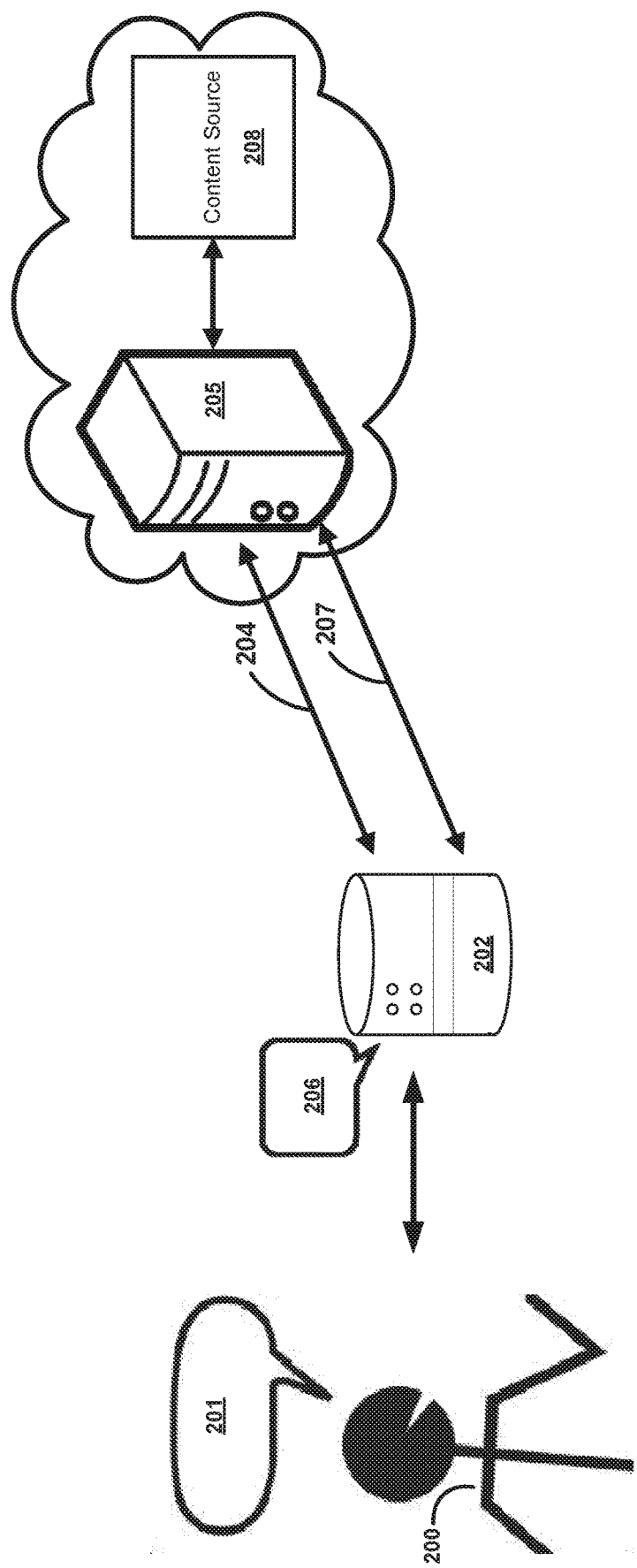
FIG. 2 is a process for managing communication sessions.

FIG. 2 is a diagram of an example process for managing communication sessions. The process can comprise communication over a network between a user 200, a voice enabled device 202, a cloud-based device 205, and a content device 206. The user 200 can provide a voice input 201 to the voice enabled device 202. The voice enabled device 202 (e.g., voice enabled device 100) can be a smart speaker, a system control device, a smart phone, a communications terminal, a wireless device, and the like, for example. To provide the voice input 201, the user 200 can speak a phrase, command, question, a combination thereof, and the like. For example, the user 202 can speak say "what is the address for the hospital?" The voice enabled device 202 can receive the voice input 201 via one or more microphones.

The voice enabled device 202 can request/initiate a network communication session 204 (e.g., network communication session, etc . . . ) with the cloud-based device 205. The network communication session 204 can comprise Wi-Fi, cellular, satellite, BLUETOOTH®, combinations thereof, and the like. The voice enabled device 202 can transmit data indicative of the voice input 201 to the cloud-based device 205 via the network communication session 204. For example, the voice enabled device 202 can receive the voice input 201 via the one or more microphones, and the voice enabled device 202 can use one or more analog-to-digital conversion methods/techniques to generate a signal that can be transmitted as the data indicative of the voice input 201 to the cloud-based device 205 via the network communication session 204. The data indicative of the voice input 201 can be a digitized version of the voice input 201 (e.g., audible input, analog input, etc . . . ).

The cloud-based device 205 can be a device such as the computing device 104, a server, a cloud-based storage device, and the like, for example. The cloud-based device 205 can be configured to use natural language processing to classify voice inputs (e.g., the voice input 201) as a type of communication session (e.g., conversation, etc . . . ) of a plurality of types of communication sessions. For example, the cloud-based device 205 can be configured to classify the voice input 201 as a type of communication session associated with navigation because the voice input 201 comprises a query term/text such as "what is" and "the address" that matches at least a portion of stored correlative content (e.g., stored in a storage/database, stored in the database 114, etc . . . ). The stored correlative content can comprise addresses, locations, and the like. As another example, the cloud-based device 205 can use natural language processing to convert voice input 201 to text and compare the text to correlative content based on a threshold. For example, the text can be associated with and/or matched to correlative content (e.g., a specific set of stored voice input types, domains, etc . . . ). If the text cannot be directly associated with and/or matched to the correlative content, then text can be associated with and/or matched to the correlative content if a least a portion of the text (e.g., a threshold portion) matches the correlative content. The text can be associated with and/or matched to correlative content (e.g., a corpus of data/information, etc . . . ). Each association/match between the text and the respective correlative content of the plurality of correlative content can be ranked. The rank can be based on how well the text matches the correlative content (e.g., a quantity of similar phrases/characters, etc . . . ).

The cloud-based device 205 can determine that the voice input 201 is a type of communication session can be based on matches between the text and the correlative content with higher/increased rank. The correlative content can be any information in storage accessible by the cloud-based device 205. For example, the correlative content can comprise stored commands/confirmation-based information (e.g., up, down, zoom in, zoom out, select, call "name of contact," power device on, power device off, yes, no, sure, cancel, etc . . . ), navigation-based information (e.g., location references, maps, directions, addresses, contact information, etc . . . ), additional information (e.g., dictionary-based information, encyclopedic information, etc . . . ), combinations thereof, and the like.

The cloud-based device 205 can cause retrieval of an appropriate response and/or appropriate information from the correlative content. For example, the cloud-based device 205 can cause retrieval of an appropriate response and/or appropriate information from the correlative content after determining that the text such as "what is" and "the address" derived from the voice input 201 matches at least a portion of the stored correlative content (e.g., common query terms associated with navigation, etc . . . ). The cloud-based device 205 can retrieve and/or cause retrieval of an appropriate response and/or appropriate information from the correlative content. The cloud-based device 205 can determine that, based on the type of communication session (e.g., conversation, etc . . . ), that the voice input 201 can/should be further processed by the voice enabled device 202.

For example, based on the type of communication session (e.g., conversation, etc . . . ), the cloud-based device 205 can determine whether the voice input 201 (or any voice input(s)) can/should be further processed by the cloud-based device 205 or the voice enabled device 202. The voice enabled device 202 can be configured to not to further process the voice input 201 (or any voice input(s)). For example, based on the type of communication session, the voice enabled device 202 can/will not process the voice input 201 (or any voice input(s)). The voice enabled device 202 can be configured to not to initially process the voice input 201 (or any voice input(s)) before providing the voice input 201 (or any voice input(s)) to the cloud-based device 205. For example, the voice enabled device 202 can/will not attempt to process the voice input 201 (or any voice input(s)). The voice enabled device 202 can provide (e.g., provided via a network communication session, etc . . . ) the voice input 201 (or any voice input(s)) to the cloud-based device 205 to be processed.

The cloud-based device 205 can process the voice input 201 (or any voice input(s)) received from the voice enabled device 202. The cloud-based device 205 can determine that the voice input 201 (or any voice input(s)) can/should be further processed by the cloud-based device 205 or the voice enabled device 202. For example, the cloud-based device 205 can classify the voice input 201 as a type of communication session associated with detailed voice activity (e.g., a request for information, a request for content/item analysis, a detailed/extensive request/query, etc . . . ). The cloud-based device 205 can determine that types of communication sessions (e.g., conversations, etc . . . ) associated with detailed voice activity can/should be further processed by the cloud-based device 205. The cloud-based device 205 can determine that types of communication sessions associated with detailed voice activity can/should be further processed by the cloud-based device 205 because at least a portion of the detailed voice activity can be associated with and/or requires information that is associated with one or more content sources (e.g., content source(s) 127, a webpage, an online data repository, a search engine, a server, etc . . . ).

The cloud-based device 205 can classify the voice input 201 (or any voice input(s)) as a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), combinations thereof. The cloud-based device 205 can determine that types of communication sessions associated with navigation, commands, confirmation, combinations thereof, and/or the like can/should be processed by the voice enabled device 202. The cloud-based device 205 can determine that types of communication sessions associated with navigation, commands, confirmation, combinations thereof, and/or the like can/should be processed by the voice enabled device 202 because the types of communication sessions can be associated with correlative content that can be provided to the voice enabled device 202 by the cloud-based device 205 and/or correlative content that is already stored with (e.g., stored in the storage module 103, etc . . . ) and/or associated with the voice enabled device 202. The cloud-based device 205 can determine that types of communication sessions associated with navigation, commands, confirmation, combinations thereof, and/or the like can/should be processed by the voice enabled device 202 because the voice enabled device 202 possesses sufficient resources (e.g., hardware, software, data, etc . . . ) to process the type of voice input/communication session.

The cloud-based device 205 can transmit a signal/instruction to the voice enabled device 202 to further process the voice input/communication session. The signal/instruction transmitted to the voice enabled device 202 to further process the voice input 201 can be transmitted/sent via the network communication session 204. The signal/instructions can instruct the voice enabled device 100 to process the voice input 201 based on stored predetermined information. The network communication session 204 can be terminated. The network communication session 204 can be terminated after instructing the voice enabled device 202 to process the voice input 201. Terminating the network communication session can conserve resources (e.g., bandwidth, network resources, processing resources, data resources, etc . . . ). The cloud-based device 205 can terminate the network communication session based expiration of a time window. For example, the network communication session can be persisted for the time window. The time window can be associated with any duration (e.g., amount of time, etc . . . ). The time window can be associated with the type of communication session (e.g., conversation, etc . . . ). The time window can be based on an amount of time required for the voice enabled device 202 to process a previous voice input associated with the type of communication session. For example, the cloud-based device 205 can determine an amount of time associated with the voice enable device 202 processing a previous voice input/type of communication session, and the amount of time associated with the voice enabled device 202 processing the previous voice input/type of communication session can be used to determine the time window. The network communication session can be terminated after the time window expires.

The voice enabled device 202 can process the voice input 201. The voice enabled device 202 can process the voice input 201 by associating/mapping text derived from the voice input 201 to at least a portion of stored correlative content and providing an audible response or an audible portion of a response to a user associated with the voice input. For example, text such as "what is" and "the address" derived from a voice input 201 (e.g., "what is the address to the hospital") can be determined to match at least a portion of stored correlative content (e.g., common query terms associated with navigation, etc . . . ). The voice enabled device 202 can retrieve additional stored correlative content such as addresses, locations, and the like based on the match between the text derived from the voice input 201 and the stored correlative content. The voice enabled device 202 can provide a response 206 based on the stored correlative content and/or additional stored correlative content.

At any time, the voice enabled device 202 can determine that it is unable to process voice input (e.g., the voice input 201). For example, the voice enabled device 202 can determine that at least a portion of text derived from voice input does not match at least a portion of correlative content. The voice enabled device 202 can request/initiate another network communication session 207 with the cloud-based device 205. The voice enabled device 202 can transmit at least the portion of the text that does not match at least the portion of correlative content to the cloud-based device 205 via the network communication session 207.

The cloud-based device 205 can determine additional information associated with the portion of the text that does not match at least the portion of correlative content. The cloud-based device 205 can request/retrieve the additional information (e.g., a search query response, an answer to a question, etc . . . ) associated with the portion of the text that does not match at least the portion of correlative content from the content source 208 (e.g., content source(s) 127). Additionally, the cloud-based device 205 can request additional information (e.g., a search query response, an answer to a question, etc . . . ) from the content source 208 based on a type of communication session. For example, when determining a type of communication session associated with a voice input, the cloud-based device 205 can request additional information (e.g., a search query response, an answer to a question, etc . . . ) from the content source 208 based on the type of communication session. For example, if the cloud-based device 205 determines that the voice input is associated with a type of communication session associated with detailed voice activity (e.g., a request for information, a request for content/item analysis, a detailed/extensive request/query, etc . . . ), the cloud-based device 205 can request additional data from the content source 208. The additional information can be provided to the voice enabled device 202. The voice enabled device 202, based on the additional information, can generate/provide an audible response (e.g., response 206, a search query response, an answer to a question, etc . . . ) or an audible portion of a response to a user based on the voice input. For example, the voice enabled device 202 can convert/map the additional information to acoustic information (e.g., convert/map text/data files associated with the additional information to one or more acoustic files, etc . . . ), and provide the acoustic information to the user. The voice enabled device 202 can provide the acoustic information (e.g., converted additional information, etc . . . ) to the user via one or more speakers configured with the voice enabled device 202.

Figure 3:
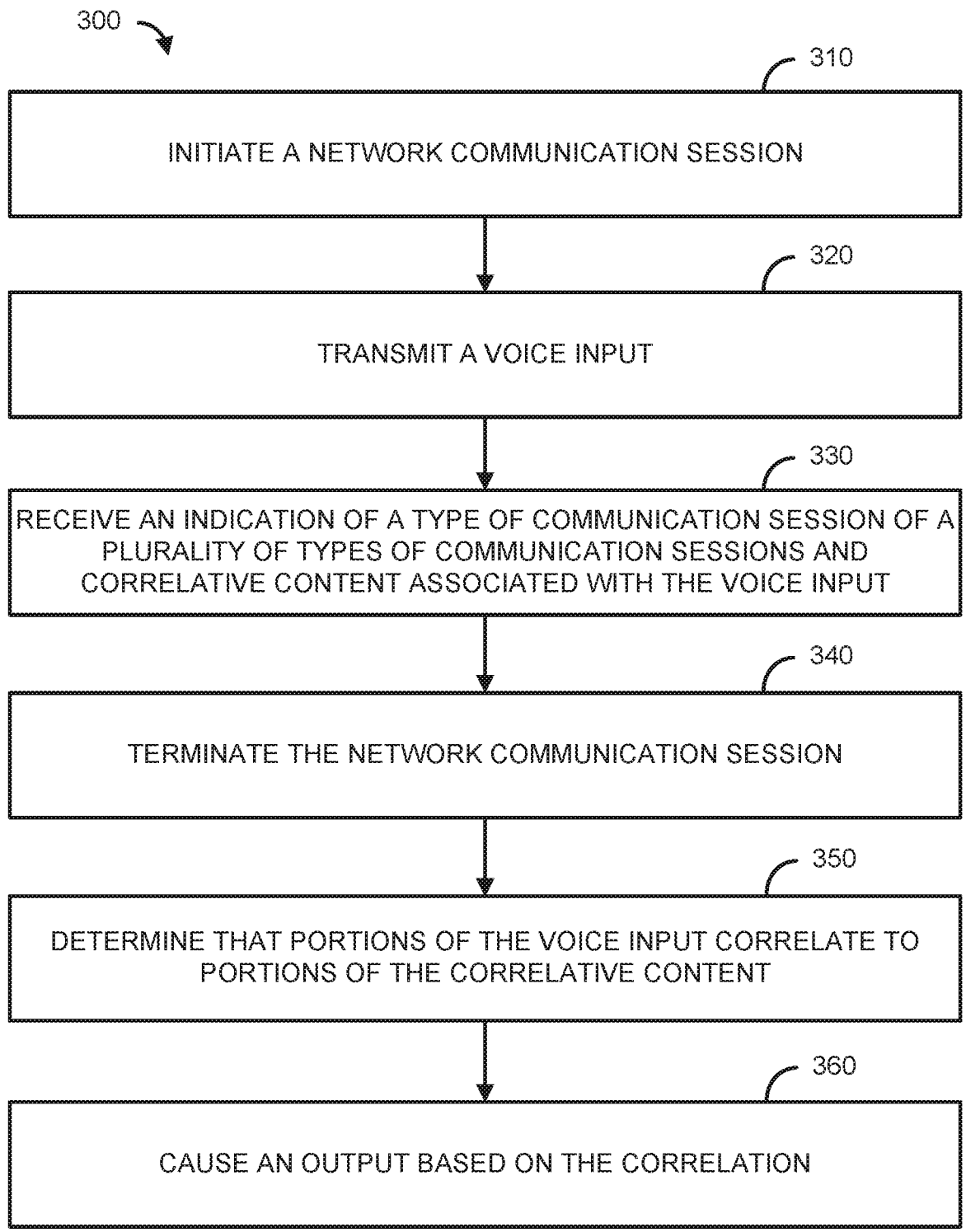
FIG. 3 is a flowchart of an example method for managing communication sessions.

FIG. 3 is a flowchart of an example method 300. At 310, a voice enabled device (e.g., voice enabled device 100, voice enabled device 202, etc . . . ) can initiate a first network communication session with a computing device. The voice enabled device can initiate the first network communication session (e.g., network communication session 204) with the computing device in response to detecting a voice input. For example, the voice enabled device can be a smart speaker, a system control device, a smart phone, a communications terminal, a wireless device, and the like. The voice enabled device can be configured with one or more microphones to detect the voice input. The voice input can be a spoken (e.g., voice) command or audible query from a user. The voice input can be a query (e.g., "what is the address for the hospital?"), a command (e.g., "turn on the television."), or any other type of voice input, such as detailed/extensive requests and/or queries, for example. The voice enabled device can initiate the first network communication session with the computing device so that the voice input can be processed and the user can be provided an audible response or an audible portion of a response based on the voice input. A network communication session (e.g., the first network communication session, etc . . . ) can comprises Wi-Fi, cellular, satellite, BLUETOOTH®, combinations thereof, and the like.

At 320, the voice enabled device can transmit data indicative of the voice input to the computing device. For example, the voice enabled device can use one or more analog-to-digital conversion methods/techniques to generate a signal that can be transmitted as the data indicative of the voice input to the computing device. The data indicative of the voice input can be a digitized version of the voice input (e.g., audible input, analog input, etc . . . ). The voice enabled device can transmit the data indicative of the voice input to the computing device via the first network communication session. The computing device can receive the data indicative of the voice input and determine a type of communication session associated with the voice input. The type of communication session can be of a plurality of types of communication sessions such as a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), a type of communication session associated with detailed voice activity (e.g., a request for information, a request for content/item analysis, a detailed/extensive request/query, etc . . . ), combinations thereof, and the like. The computing device can determine any type of communication session (e.g., conversation, etc . . . ). The computing device can determine the type of communication session by applying speech-to-text translation and/or natural language processing of the data indicative of the voice input. The computing device can apply one or more voice analysis algorithms to the data indicative of the voice input to extract a word or words (e.g., phrase). The computing device can convert the word or words to text and compare the text to stored correlative content to determine a type of communication session associated with the voice input. For example, the computing device can use natural language processing to can convert the word or words to text and compare the text to correlative content based on a threshold. For example, the text can be associated with and/or matched to correlative content (e.g., a specific set of stored voice input types, domains, etc . . . ). If the text cannot be directly associated with and/or matched to the correlative content, then text can be associated with and/or matched to the correlative content if a least a portion of the text (e.g., a threshold portion) matches the correlative content. The text can be associated with and/or matched to a plurality of correlative content. Each association/match between the text and the respective correlative content of the plurality of correlative content can be ranked. The rank can be based on how well the text matches the correlative content (e.g., a quantity of similar phrases/characters, etc . . . ). The type of communication session can be determined based on matches between the text and the correlative content with higher/increased rank. The type of communication session (e.g., conversation, etc . . . ) can be determined by any suitable method.

Based on the type of communication session (e.g., conversation, etc . . . ), the computing device can determine whether the voice input (e.g., the data indicative of the voice input) can be further processed by the voice enabled device. For example, the computing device can determine that voice input can be classified as a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), combinations thereof, and the like can be further processed by the voice enabled device. Also, the computing device can determine that voice input can be classified as a type of communication session associated with detailed voice activity (e.g., a request for information, a request for content/item analysis, a detailed/extensive request/query, etc . . . ) should be further processed by the control device. Based on the determination that the voice input can be further processed by voice enabled device, the computing device can transmit a signal/instructions to the voice enabled device to further process the voice input. The signal/instructions can comprise an indication of a type of communication session, of a plurality of types of communication sessions, associated with the voice input.

At 330, the voice enabled device can receive an indication of a type of communication session (e.g., conversation, etc . . . ) from a plurality of types of communication sessions. The voice enabled device can receive, based on the data indicative of the voice input, the indication of the type of communication session and correlative content (e.g., navigational information, one or more commands, content provided by one or more content sources, etc . . . ) from the computing device. For example, the voice enabled device can receive an indication that the voice input (e.g., "what is the address for the hospital?") is a type of communication session associated with navigation. Based on the indication of the type of communication session, the voice enabled device can further process the voice input.

The voice enabled device can the correlative content from the computing device. The correlative content can be associated with the indication of the type of communication session (e.g., conversation, etc . . . ). For example, based on the indication that the voice input is a type of communication session associated with navigation, additional information can comprise location-based information such as maps, addresses, global positioning information, and the like. The voice enabled device can receive and process voice inputs at an increased/improved rate by receiving an indication of a type of communication session and/or correlative content from the computing device. For example, the voice enabled device can receive a current voice input from a user contemporaneous to the computing device processing data indicative of a previous voice input to determine a type of communication session and/or correlative content associated with the previous voice input. The voice enabled device and the computing device can share voice input processing resources.

At 340, the voice enabled device can terminate the first network communication session. The voice enabled device can terminate the first network communication session based on the indication of the type of communication session. For example, the voice enabled device can determine, based on an indication of a type of communication session associated with navigation, a type of communication session associated with one or more commands, a type of communication session associated with confirmation, and/or the like, to process the voice input. The first network communication session can be persisted while the voice enabled device determines to process the voice input, while the voice enabled device receives correlative content from the computing device to process the voice input, and/or while the voice enabled device determines that it has sufficient information/resources (e.g., correlative content) to process the voice input.

The voice enabled device can terminate the first network communication session based expiration of a time window. For example, the first network communication session can be persisted for the time window. The time window can be associated with any duration (e.g., amount of time, etc . . . ). The time window can be associated with the type of communication session. The time window can be based on an amount of time required to process a previous voice input associated with a type of communication session. For example, the voice enabled device can determine an amount of time associated with processing a previous voice input/type of communication session, and the amount of time associated with processing the previous voice input/type of communication session can be used to determine the time window. The first network communication session can be terminated after the time window expires.

Any time the voice enabled device determines that it is unable to process the voice input, such as determining that at least a portion of the derived text does not match at least a portion of correlative content, the voice enabled device can request/initiate a second network communication session with the computing device. The voice enabled device can transmit at least the portion of the text that does not match at least the portion of correlative content to the computing device via the second network communication session. The computing device can determine additional information associated with the portion of the text that does not match at least the portion of correlative content. To determine additional information associated with the portion of the text that does not match at least the portion of correlative content, the computing device can request/retrieve the additional information (e.g., a search query response, an answer to a question, etc . . . ) from one or more content sources.

At 350, the voice enabled device can determine that at least a portion of the voice input (e.g., the data indicative of the voice input) correlates with at least a portion of the correlative content. For example, the voice enabled device can determine that at least a portion (e.g., text derived from the voice input via speech-to-text translation and/or natural language processing) of the voice input correlates with at least a portion of the correlative content by associating at least a portion of the voice input with at least a portion of the correlative content and/or additional information received from the computing device. The correlative content can be associated with the type of communication session associated with the voice input determined by the computing device. For example, text such as "what is" and "the address" derived from a voice input (e.g., "what is the address for the hospital?") can be determined to match at least a portion of stored correlative content associated with navigation (e.g., stored in the database 114) or the additional information, such as addresses, locations, and the like. As another example, based on a scenario where the computing device provides an indication that a voice input query, "turn on the television," is associated with a type of communication session associated command, text derived from the voice input query can be determined to match at least a portion of stored correlative content associated with one or more operational commands. The one or more operational commands can be used to control one or more functions/services associated with the voice enabled device.

At 360, the voice enabled device can cause an output. The voice enabled device can cause an output based on determining that at least the portion of the data indicative of the voice input correlates with at least the portion of the correlative content. The output can be an audible response to the voice input, an execution of a command associated with the voice input and/or used to control one or more controllable devices, and/or the like. The output can be any type of output associated with the voice input.

FIG. 4 is a flowchart of an example method 400. At 410, a computing device (e.g., computing device 104, cloud-based device 205, remote computing device, etc . . . ) can receive a request for a network communication session. The computing device can receive the request for the network communication session from a voice enabled device (e.g., the voice enabled device 100, the voice enabled device 202, a smart speaker, a system control device, a smart phone, a communications terminal, a wireless device, etc . . . ). The request for the network communication session can be in response to the voice enabled device detecting a voice input from a user. The voice enabled device can detect the voice input via one or more microphones configured with the voice enabled device. The voice input can be a voice command or audible request/query from a user. The voice enabled device can initiate/request the network communication session with the computing device in order to process the voice input and provide an audible response or an audible portion of a response to the user based on the voice input.

At 420, the computing device can establish the network communication session. The computing device can establish the network communication session based on the request for the network communication session. The network communication session can employ a long-range communication technique, such as cellular, satellite, a combination thereof, and the like. The network communication session can be a secure network communication session. As such, data (e.g., data indicative of the voice input) communicated via the network communication session can be encrypted/decrypted based on one or more security protocols. The network communication session can be based on state information associated with the voice enabled device, the computing device, or combinations thereof. For example, one or more of the voice enabled device and computing device can save information about the session (e.g., a session history, etc . . . ) in order to be able to communicate. The network communication session can be a stateless network communication session, such that the communication consists of independent requests/responses (e.g., independent exchanges) between the voice enabled device and the computing device.

At 430, the computing device can receive data indicative of the voice input. For example, the voice enabled device can use one or more analog-to-digital conversion method/techniques to generate a signal that can be transmitted as the data indicative of the voice input to the computing device. The data indicative of the voice input can be a digitized version of the voice input (e.g., audible input, analog input, etc . . . ). The computing device can receive the data indicative of the voice input via the network communication session. If the network communication session and/or data indicative of the voice input are secured via one or more security protocols, the computing device can use one or more encryption/decryption keys associated with the one or more security protocols to determine the data indicative of the voice input. The computing device can store at least a portion of the data indicative of the voice input in storage (e.g., database 114, etc . . . ). The computing device can process the data indicative of the voice input. The computing device can process the data indicative of the voice input to determine a type of communication session associated with the voice input.

At 440, the computing device can determine a type of communication session (e.g., conversation, etc . . . ) from a plurality of types of communication sessions. The computing device can determine the type of communication session from the plurality of types of communication sessions based on the data indicative of the voice input. The plurality of types of communication sessions can comprise a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), a type of communication session associated with detailed voice activity (e.g., a request for information, a request for content/item analysis, a detailed/extensive request/query, etc . . . ), combinations thereof, and the like. The computing device can determine any type of communication session. The computing device can determine the type of communication session by applying speech-to-text translation and/or natural language processing of the data indicative of the voice input. The computing device can apply one or more voice analysis algorithms to the data indicative of the voice input to extract a word or words (e.g., phrase). The computing device can convert the word or words to text and compare the text to stored correlative content to determine a type of communication session associated with the voice input. For example, the computing device can use natural language processing to can convert the word or words to text and compare the text to correlative content based on a threshold. For example, the text can be associated with and/or matched to correlative content (e.g., a specific set of stored voice input types, domains, etc . . . ). If the text cannot be directly associated with and/or matched to the correlative content, then text can be associated with and/or matched to the correlative content if a least a portion of the text (e.g., a threshold portion) matches the correlative content. The text can be associated with and/or matched to a plurality of correlative content. Each association/match between the text and the respective correlative content of the plurality of correlative content can be ranked. The rank can be based on how well the text matches the correlative content (e.g., a quantity of similar phrases/characters, etc . . . ). The type of communication session can be determined based on matches between the text and the correlative content with higher/increased rank. The type of communication session can be determined by any suitable method.

Based on the type of communication session (e.g., conversation, etc . . . ), the computing device can determine whether the voice input (e.g., the data indicative of the voice input) can be further processed by the voice enabled device. For example, the computing device can determine that voice input can be classified as a type of communication session associated with navigation, a type of communication session associated with confirmation, a type of communication session associated with control, combinations thereof, and the like can be further processed by the voice enabled device. Also, the computing device can determine that voice input can be classified as a type of communication session associated with detailed voice activity (e.g., a request for information, a request for content/item analysis, a detailed/extensive request/query, etc . . . ) should be further processed by the control device. The computing device can determine any type of communication session and whether the computing device or the voice enabled device should process a voice input based on the type of communication session.

At 450, the computing device can transmit a signal/instructions to the voice enabled device. The computing device can transmit the signal/instructions to the voice enabled device based on the type of communication session (e.g., conversation, etc . . . ). The signal/instructions can comprise an indication of a type of communication session, of a plurality of types of communication sessions, associated with the voice input. The signal/instructions can instruct the voice enabled device to process the voice input. The voice enabled device can process the voice input (e.g., data indicative of the voice input) by associating at least a portion (e.g., text derived from the voice input via speech-to-text translation and/or natural language processing) of the voice input with at least a portion of correlative content. For example, text such as "what is" and "the address" derived from a voice input (e.g., "what is the address for the hospital?") can be determined to match at least a portion of stored correlative content (e.g., stored in the database 114) such as addresses, locations, and the like. As another example, text such as "turn on the television," derived from a voice input query "turn on the television," can be determined to match at least a portion of stored correlative content associated with one or more operational commands. The one or more operational commands can be used to control one or more functions/services associated with the voice enabled device. The voice enabled device can execute the one or more operational commands. The one or more operational commands can be used to control one or more controllable devices.

At 460, the computing device can terminate the network communication session with the voice enabled device. The computing device can terminate the network communication session based on the determination that the voice enabled device can to process the voice input (e.g., based on the type of communication session). For example, the network communication session can be persisted while the computing device determines the type of communication session and/or whether to process the voice input based on the type of communication session.

The computing device can terminate the network communication session based expiration of a time window. For example, the network communication session can be persisted for the time window. The time window can be associated with any duration (e.g., amount of time, etc . . . ). The time window can be associated with the type of communication session. The time window can be based on an amount of time required for the voice enabled device to process a previous voice input associated with the type of communication session. For example, the computing device can determine an amount of time associated with the voice enable device processing a previous voice input/type of communication session, and the amount of time associated with the voice enabled device processing the previous voice input/type of communication session can be used to determine the time window. The network communication session can be terminated after the time window expires.

At any time that the voice enabled device determines that it is unable to process the voice input, such as determining that at least a portion of the derived text does not match at least a portion of correlative content, the voice enabled device can request/initiate another network communication session with the computing device. The voice enabled device can transmit at least the portion of the text that does not match at least the portion of correlative content to the computing device via the second network communication session. The computing device can determine additional information associated with the portion of the text that does not match at least the portion of correlative content. To determine additional information associated with the portion of the text that does not match at least the portion of correlative content, the computing device can request/retrieve the additional information (e.g., a search query response, an answer to a question, etc . . . ) from one or more content sources.

FIG. 5 is a flowchart of an example method 500. At 510, a computing device (e.g., computing device 104, cloud-based device 205, remote computing device, etc . . . ) can receive a request for a network communication session. The computing device can receive the request for the network communication session from a voice enabled device (e.g., the voice enabled device 100, the voice enabled device 202, a smart speaker, a system control device, a smart phone, a communications terminal, a wireless device, etc . . . ). The request for the network communication session can be in response to the voice enabled device detecting a voice input from a user. The voice enabled device can initiate/request the network communication session with the computing device in order to process the voice input and provide an audible response or an audible portion of a response to the user based on the voice input. The network communication session can employ a long-range communication technique, such as Wi-Fi, cellular, satellite, a combination thereof, and the like.

At 520, the computing device can establish the network communication session. The computing device can establish the network communication session based on the request for the network communication session. The network communication session can be a secure network communication session. As such, data (e.g., data indicative of the voice input) communicated via the network communication session can be encrypted/decrypted based on one or more security protocols. The network communication session can be based on state information associated with the voice enabled device, the computing device, or combinations thereof. For example, one or more of the voice enabled device and computing device can save information about the session (e.g., session history) in order to be able to communicate. The network communication session can be a stateless network communication session, such that the communication consists of independent requests/responses (e.g., independent exchanges) between the voice enabled device and the computing device.

At 530, the computing device can receive data indicative of the voice input. For example, the voice enabled device can use one or more analog-to-digital conversion methods/techniques to generate a signal that can be transmitted as the data indicative of the voice input to the computing device. The data indicative of the voice input can be a digitized version of the voice input (e.g., audible input, analog input, etc . . . ). The computing device can receive the data indicative of the voice input via the network communication session. If the network communication session and/or data indicative of the voice input are secured via one or more security protocols, the computing device can use one or more encryption/decryption keys associated with the one or more security protocols to determine the data indicative of the voice input. The computing device can store at least a portion of the data indicative of the voice input in storage (e.g., database 114, etc . . . ). The computing device can process the data indicative of the voice input. The computing device can process the data indicative of the voice input to determine a type of communication session associated with the voice input.

At 540, the computing device can determine a type of communication session (e.g., conversation, etc . . . ) from a plurality of types of communication sessions. The computing device can determine the type of communication session from the plurality of types of communication sessions based on the data indicative of the voice input. The plurality of types of communication sessions can comprise a type of communication session associated with navigation (e.g., a request for directions, location information, etc . . . ), a type of communication session associated with commands (e.g., up, down, zoom in, zoom out, select, call "name of contact," power device on, power device off, etc . . . ), a type of communication session associated with confirmation (e.g., yes, no, sure, cancel, etc . . . ), a type of communication session associated with detailed voice activity (e.g., a request for information, a request for content/item analysis, a detailed/extensive request/query, etc . . . ). The computing device can determine any type of communication session. The computing device can determine the type of communication session by applying speech-to-text translation and/or natural language processing of the data indicative of the voice input.

For example, the computing device can use natural language processing to can convert the word or words to text and compare the text to correlative content based on a threshold. The text can be associated with and/or matched to correlative content (e.g., a specific set of stored voice input types, domains, etc . . . ). If the text cannot be directly associated with and/or matched to the correlative content, the text can be associated with and/or matched to the correlative content if a least a portion of the text (e.g., a threshold portion) matches the correlative content. The text can be associated with and/or matched to a plurality of correlative content. Each association/match between the text and the respective correlative content of the plurality of correlative content can be ranked. The rank can be based on how well the text matches the correlative content (e.g., a quantity of similar phrases/characters, etc . . . ). The type of communication session can be determined based on matches between the text and the correlative content with higher/increased rank. The computing device can determine the type of communication session by other methods.

For example, the computing device can apply one or more voice analysis algorithms to the data indicative of the voice input to extract a word or words (e.g., phrase). The computing device can convert the word or words to text and compare the text to stored correlative content to determine a type of communication session (e.g., conversation, etc . . . ) associated with the voice input. Additionally, the computing device can perform natural language processing and determine that the voice input comprises a quantity of phrases that are either less than a threshold or satisfy the threshold. For example, a threshold can be set that dictates that a voice input comprising two or less phrases (or a certain character length) does not satisfy the threshold and can thus be classified as a first type of communication session (e.g., a type of communication session associated with navigation, a type of communication session associated with confirmation, a type of communication session associated with control, etc . . . ). Thus, a voice input comprising three or more phrases of a certain character length can satisfy (e.g., meet and/or exceed) the threshold and be classified as a second type of communication session (e.g., a type of communication session associated with detailed voice activity (e.g., a request for information, a request for content/item analysis, a detailed/extensive request/query, etc . . . )). The computing device, based on the voice input, can determine any number of types of communication session (e.g., a plurality of types of communication sessions). The computing device can determine the type of communication session by any suitable method.

Based on the type of communication session (e.g., conversation, etc . . . ), the computing device can determine the voice input classifies as a type of communication session that should be further processed by the computing device. For example, the computing device can determine the type of communication session associated with the voice input is a type of communication session associated with detailed voice activity (e.g., a request for information, a request for content/item analysis, a detailed/extensive request/query, etc . . . ) and should thus be further processed by the control device.

At 550, the computing device can determine information associated with the voice input (e.g., data indicative of the voice input). The computing device can determine the information associated with the voice input based on the type of communication session (e.g., conversation, etc . . . ). For example, if the computing device determines that the voice input is associated with a type of communication session associated with detailed voice activity (e.g., a request for information, a request for content/item analysis, a detailed/extensive request/query, etc . . . ), the computing device can request information associated with the voice input from a content source (e.g., content source(s) 127, content source 208, etc . . . ).

At 560, the computing device can transmit the information associated with the voice input (e.g., data indicative of the voice input) to the voice enabled device. For example, the content source can provide the information associated with the voice input (e.g., a search query response, an answer to a question, etc . . . ). The computing device can receive the information associated with the voice input and transmit the additional information to the voice enabled device. The computing device can terminate the network communication session. For example, the computing device can terminate the network communication session after transmitting the additional information to the voice enabled device. Terminating the network communication session can enable resources (e.g., communication channels, intermediary communication devices, the computing device, the voice enabled device, etc . . . ) associated with the network communication session to be reallocated (e.g., data and/or resources associated with the network communication session can be reallocated by a load balancer or similar device, etc . . . ) and/or reserved. The voice enabled device, based on the additional information, can generate/provide an audible response or an audible portion of a response to a user that is associated with the voice input. For example, the voice enabled device can convert/map the additional information to acoustic information (e.g., convert/map text/data files associated with the additional information to one or more acoustic files, etc . . . ), and provide the acoustic information to the user. The voice enabled device can provide the acoustic information (e.g., converted additional information, etc . . . ) to the user via one or more speakers or the like configured with the voice enabled device.

The methods and systems can be implemented on a computer 601 as shown in FIG. 6 and described below. By way of example, the voice enabled device 100, the computing device 104, the voice enabled device 202, and the cloud-based device 205 can be a computer as shown in FIG. 6. Similarly, the methods and systems disclosed can utilize one or more computers to perform one or more functions in one or more locations. FIG. 6 is a block diagram of an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components in the example operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, communication session classification software 606, correlative data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Example readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the correlative data 607 and/or program modules such as the operating system 605 and the communication session classification software 606 that are immediately accessible to and/or are presently operated on by the one or more processors 603.

The computer 601 can also comprise other removable/non-removable, volatile/non-volatile computer storage media. By way of example, FIG. 6 shows the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the communication session classification software 606. Each of the operating system 605 and the communication session classification software 606 (or some combination thereof) can comprise elements of the programming and the communication session classification software 606. The correlative data 607 can also be stored on the mass storage device 604. The correlative data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

The user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

The display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of example, application programs and other executable program components such as the operating system 605 are shown herein as discrete blocks, although it is recognized that such programs and components reside at various times in different storage components of the computing device 601, and are executed by the one or more processors 603 of the computer. An implementation of the communication session classification software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as example only, with a true scope and spirit being indicated by the following claims.

What is claimed is:

1. A method, comprising:
    initiating, based on a voice input, a first network communication session with a computing device;
    sending, to the computing device via the first network communication session, data indicative of the voice input;
    receiving, from the computing device, based on the data indicative of the voice input, an indication of a type of communication session from a plurality of types of communication sessions and correlative content associated with the voice input;
    terminating, based on the indication of the type of communication session, the first network communication session;

determining that at least a portion of the data indicative of the voice input correlates with at least a portion of the correlative content; and causing, based on determining that at least the portion of the data indicative of the voice input correlates with at least the portion of the correlative content, an output.

2. The method of claim 1, further comprising:

initiating, based on determining that at least another portion of the data indicative of the voice input does not correlate with at least the portion of the correlative content, a second network communication session with the computing device; and sending, to the computing device via the second network communication session, at least the another portion of the data that does not correlate with at least the portion of the correlative content.

3. The method of claim 2, further comprising, determining, by the computing device, information associated with at least the another portion of the data that does not correlate with at least the portion of the correlative content by one or more of requesting the information from a content source, retrieving the information from storage, or combinations thereof.

4. The method of claim 1, wherein terminating the first network communication session comprises terminating the first network communication session after expiration of a time window, wherein the time window is based on an amount of time required to process a previous voice input associated with the type of communication session.

5. The method of claim 1, wherein the plurality of types of communication sessions comprise one or more of a type of communication session associated with navigation, a type of communication session associated with confirmation, or a type of communication session associated with a request for content.

6. The method of claim 1, wherein associating at least the portion of the data indicative of the voice input with at least the portion of the correlative content comprises:

converting the data indicative of the voice input to text; and comparing the text to at least the portion of the correlative content.

7. The method of claim 1, wherein causing the output comprises one or more of generating an audible response to the voice input, or executing a command associated with the voice input.

8. The method of claim 1, wherein causing the output comprises causing one or more devices to execute a command associated with the voice input.

9. A method, comprising:

receiving, from a voice-enabled device, a request for a network communication session;

establishing, based on the request, the network communication session;

receiving from the voice-enabled device via the network communication session, data indicative of a voice input;

determining, based on the data indicative of the voice input, a type of communication session from a plurality of types of communication sessions;

sending, based on the type of communication session, a signal and correlative content to the voice-enabled device, wherein the signal instructs the voice-enabled device to associate at least a portion of the data indicative of the voice input with at least a portion of the correlative content; and terminating the network communication session.

10. The method of claim 9, wherein terminating the network communication session comprises terminating the network communication session after expiration of a time window, wherein the time window is based on an amount of time required to associate at least a portion of data indicative of a previous voice input with at least the portion of the correlative content.

11. The method of claim 9, wherein determining the type of communication session from the plurality of types of communication sessions comprises:

converting the data indicative of the voice input to text; and comparing the text to the correlative content; and determining that the text matches at least the portion of the correlative content that is associated with the type of communication session.

12. The method of claim 9, wherein the plurality of types of communication sessions comprise one or more of a type of communication session associated with navigation, a type of communication session associated with confirmation, or a type of communication session associated with a request for content.

13. The method of claim 9, wherein the signal further causes the voice-enabled device to one or more of generate an audible response to the voice input, execute a command associated with the voice input, or cause one or more devices to execute the command associated with the voice input.

14. The method of claim 10, further comprising:

sending, to a load balancer, based on terminating the network communication session, a notification; and reallocating, by the load balancer, to another voice-enabled device, one or more resources associated with the voice input.

15. A method comprising:

receiving, from a voice-enabled device, a request for a network communication session;

establishing, based on the request, the network communication session;

receiving from the voice-enabled device via the network communication session, data indicative of a voice input;

determining, based on the data indicative of the voice input, a type of communication session from a plurality of types of communication sessions;

determining, based on the type of communication session, information associated with the data indicative of the voice input; and sending the information to the voice-enabled device.

16. The method of claim 15, wherein determining the type of communication session from the plurality of types of communication sessions comprises:

processing, via natural language processing, the data indicative of the voice input;

determining, based on the natural language processing, that the data indicative of the voice input comprises a quantity of phrases that are either less than a threshold or satisfy the threshold;

determining that the data indicative of the voice input is a first type of communication session when the quantity of phrases is less than the threshold; and determining that the data indicative of the voice input is a second type of communication session when the quantity of phrases satisfies the threshold.

17. The method of claim 15, wherein the plurality of types of communication sessions comprise one or more of a type of communication session associated with navigation, a type of communication session associated with confirmation, or a type of communication session associated with a request for content.

18. The method of claim 16, wherein the first type of communication session is a type of communication session associated with navigation and the second type of communication session is a type of communication session associated with a request for content.

19. The method of claim 15, wherein determining the information associated with the data indicative of the voice input comprises one or more of requesting the information from a content source, retrieving the information from storage, or combinations thereof.

20. The method of claim 15 further comprising, causing, based on the information, the voice-enabled device to one or more of generate an audible response to the voice input, execute a command associated with the voice input, or cause one or more devices to execute the command associated with the voice input.

* * * * *